Oct. 16, 1934.    A. O. BRADFORD    1,977,301
SEAL
Filed Jan. 25, 1933

INVENTOR-
A. O. Bradford
BY
Emery, Booth, Varney & Whittemore
ATTORNEYS

Patented Oct. 16, 1934

1,977,301

UNITED STATES PATENT OFFICE 1,977,301

SEAL

Andrew O. Bradford, Saltilla, Mexico

Application January 25, 1933, Serial No. 653,392
In Mexico December 16, 1932

1 Claim. (Cl. 292—325)

This invention relates to seals, particularly to seals of the type which comprises a band and an element for protecting the ends or joint of the band, and has for an object the provision of an improved seal of this character. It is desirable for many purposes to have a seal which is superior to the common lead seal which is so easily tampered with without great danger of detection. Such an improved seal is, of course, slightly more expensive than lead seals but its advantages over lead seals are so great that its added cost becomes a matter of relatively small importance. It is to the higher class of seals that the present invention is directed and it aims to produce an efficient seal at a very moderate cost. The present seal is extremely simple and easy to manufacture, involving principally turning operations; it is easy to use; and when once sealed is practically impossible to open.

The invention can best be understood by reference to the accompanying drawing of an illustrative embodiment thereof. In the drawing.

Figure 1:
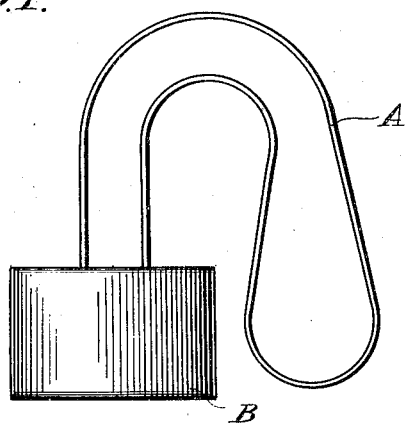
Fig. 1 is a side elevation of the assembled seal.
Figure 2:
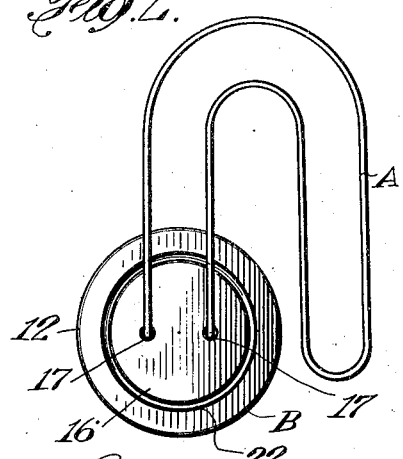
Fig. 2 is a top plan view of the same.
Figure 4:
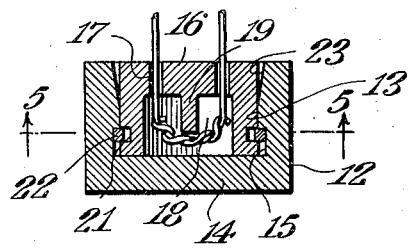
Fig. 4 is a central vertical section of the assembled parts.
Figure 3:
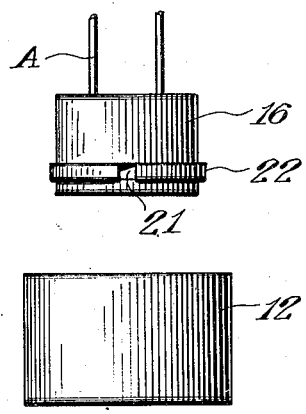
Fig. 3 is a side elevation of the parts before they are assembled.
Figure 5:
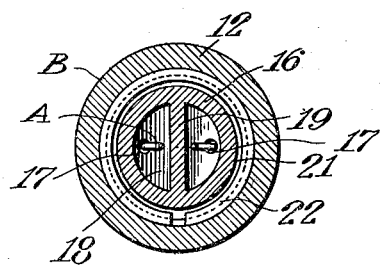
Fig. 5 is a horizontal section taken on the line 5—5 of Fig. 4.

As shown in the drawing, the seal comprises a band A, preferably of wire, and an element B for connecting the ends of the band.

The conecting element B in the preferred embodiment comprises a cylinder 12 provided with a cylindrical bore 13, a bottom 14 and an enlarged groove 15 at the lower end of the bore 13. A plug 16, also of cylindrical shape is adapted to fit within the bore 13 of the cylinder 12. The plug is provided with a pair of holes 17 for receiving the ends of the band and a recess 18 for receiving the joint or splice which is made between the ends of the band after they are threaded through the holes 17. A partition element 19 may be provided in the recess 18 for closely confining the joint of the band. This partition extends down near the bottom 14 of the cylinder for closely confining the joint or splice of the band.

The plug exteriorly is provided with a circumferential groove 21. Into this groove is placed a spring ring 22. The ring is loose in the groove so as to permit of contraction as the plug is inserted in the cylinder. The cylinder bore may be tapered at its upper end as at 23 to assist in the introduction and contraction of the ring.

When the plug is inserted into the bore of the cylinder the spring ring expands into the groove 15 and holds the plug securely in the cylinder. To insure proper retention of the plug, the groove 15 is made radially shallower than the radial thickness of the spring ring so that the latter always lies partly within the groove 15 of the cylinder and partly within the groove 21 of the plug.

The plug so closely fits the bore of the cylinder that it is practically impossible to insert a tool between them to reach the spring ring. And even if a tool could be inserted, it could not engage either the outer or the inner surfaces of the ring because these surfaces lie behind the edges of the grooves 15 and 21 of the cylinder and the plug respectively. And if a tool could be inserted between the ends of the spring ring to spread it, the parts could not be separated because, as noted, the groove of the cylinder is not deep enough to take the ring.

So long as the plug is retained in the cylinder it is impossible to reach the joint of the band to release the ends of the band because the holes 17 are so small that only the band can pass through them.

It will thus be seen that the invention provides a seal which is completely incapable of being tampered with and which can be made at relatively small expense either by casting and turning operations or either alone.

While one embodiment of the invention has been described in detail in order to illustrate the principles and advantages of the invention, it is to be understood that the invention may have other embodiments within the limits of the prior art and the scope of the subjoined claim.

I claim:

A seal of the character described, comprising in combination, a band, a plug provided with holes for receiving the ends of the band and an end recess for receiving the joint of said band, a cylinder for receiving said plug, juxtaposed grooves in said plug and cylinder, a spring ring carried in the groove of said plug, said ring lying partly within the grooves of said plug and cylinder when the parts are assembled for holding them together, the groove in said cylinder being radially shallower than the thickness of said ring to insure that the ring cannot be forced wholly into said groove, and said cylinder being provided with an outwardly tapering bore for receiving said plug and ring.

ANDREW O. BRADFORD.